United States Patent
Mak et al.

(10) Patent No.: US 8,147,787 B2
(45) Date of Patent: Apr. 3, 2012

(54) CONFIGURATIONS AND METHODS FOR FUEL GAS TREATMENT WITH TOTAL SULFUR REMOVAL AND OLEFIN SATURATION

(75) Inventors: John Mak, Santa Ana, CA (US); Robert Henderson, Huntington Beach, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 31 days.

(21) Appl. No.: 12/669,028

(22) PCT Filed: Feb. 14, 2008

(86) PCT No.: PCT/US2008/001971
§ 371 (c)(1),
(2), (4) Date: May 12, 2010

(87) PCT Pub. No.: WO2009/020473
PCT Pub. Date: Feb. 12, 2009

(65) Prior Publication Data
US 2010/0293854 A1 Nov. 25, 2010

Related U.S. Application Data

(60) Provisional application No. 60/955,004, filed on Aug. 9, 2007.

(51) Int. Cl.
*B01D 53/52* (2006.01)
(52) U.S. Cl. ........... 423/242.1; 95/177; 96/234; 96/242; 96/266; 422/608; 422/610; 422/611; 422/635

(58) Field of Classification Search .................. 422/608, 422/610, 611, 612, 635, 198, 211; 96/234, 96/242, 266; 95/177, 235; 423/242.1
See application file for complete search history.

(56) References Cited

U.S. PATENT DOCUMENTS

| 4,449,994 | A | * | 5/1984 | Hegarty et al. | ................. 62/622 |
| 4,980,046 | A | * | 12/1990 | Zarchy et al. | ................... 208/99 |
| 5,846,503 | A |   | 12/1998 | Yan | |
| 6,190,536 | B1 |   | 2/2001 | Lokhandwala et al. | |
| 7,637,987 | B2 | * | 12/2009 | Mak | ............................... 95/160 |
| 7,674,444 | B2 | * | 3/2010 | Mak | ........................ 423/242.1 |

FOREIGN PATENT DOCUMENTS

| WO | 2008/020994 A1 | 2/2008 |
| WO | WO 2008/020994 | * 2/2008 |

OTHER PUBLICATIONS

Guido Collodi, et al., The New Gasification Project at Eni Sannazzaro Refinery . . . Gasification Technologies 2004.

\* cited by examiner

*Primary Examiner* — Nina Bhat
(74) *Attorney, Agent, or Firm* — Fish & Associates, PC

(57) ABSTRACT

Refinery off gases are treated in a plant in two processing steps, wherein the off gases are first scrubbed in a wash column using lean oils for removal of heavy mercaptans and C5+ hydrocarbons, and wherein a hydrotreater is then used for saturating olefinic hydrocarbons and reducing sulfurous compounds. Most preferably, lean recycle oil is used for temperature control of the hydrotreater reactor(s) in configurations where the lean oil from a hydrotreater reactor outlet separator is mixed with the reactor feed to so cool the hydrotreater reactor via evaporation.

16 Claims, 3 Drawing Sheets

| | OFFGASES | H2 MAKEUP | HDS REACTOR INLET | HDS REACTOR OUTLET | COS REACTOR INLET | HOT SEPARATOR LIQUID | COLD SEPARATOR VAPOR | COLD SEPARATOR LIQUID | TOTAL OIL FLOW |
|---|---|---|---|---|---|---|---|---|---|
| Methane | 44.05 | | 27.53 | 29.90 | 39.07 | 1.22 | 45.16 | 0.11 | 0.89 |
| Ethane | 18.60 | | 11.66 | 14.01 | 18.27 | 0.69 | 21.12 | 0.05 | 0.50 |
| Ethylene | 2.45 | | 1.51 | | | | | | |
| Propane | 10.48 | | 8.76 | 12.39 | 15.29 | 3.33 | 15.11 | 16.40 | 7.18 |
| Propene | 4.68 | | 2.90 | | | | | | |
| i-Butane | 0.56 | | 0.52 | 0.55 | 0.65 | 0.22 | 0.54 | 1.35 | 0.55 |
| n-Butane | 0.62 | | 0.83 | 1.22 | 1.43 | 0.55 | 1.08 | 3.69 | 1.48 |
| 1-Butene | 0.51 | | 0.32 | | | | | | |
| i-Pentane | 0.02 | | 0.02 | 0.03 | 0.03 | 0.02 | 0.01 | 0.12 | 0.05 |
| n-Pentane | 0.00 | | 0.00 | 0.00 | 0.01 | 0.00 | 0.00 | 0.02 | 0.01 |
| 1-Pentene | 0.00 | | 0.00 | - | - | - | - | - | - |
| n-C11 | | | 3.78 | 4.02 | 1.37 | 12.28 | 0.00 | 10.14 | 11.68 |
| n-C12 | | | 4.87 | 5.18 | 1.27 | 17.40 | 0.00 | 9.36 | 15.07 |
| n-C13 | | | 8.95 | 9.51 | 1.63 | 34.16 | 0.00 | 12.02 | 27.67 |
| n-C14 | | | | | | | | | |
| Hydrogen | 14.53 | 100.00 | 15.44 | 9.48 | 12.43 | 0.26 | 14.37 | 0.02 | 0.19 |
| Nitrogen | 2.07 | | 1.29 | 1.37 | 1.79 | 0.04 | 2.07 | 0.01 | 0.03 |
| Oxygen | | | | - | - | - | - | - | - |
| CO2 | 0.42 | | 0.27 | 0.29 | 0.37 | 0.03 | 0.42 | 0.03 | 0.03 |
| CO | 0.95 | | 0.59 | - | - | - | - | - | - |
| Sulfurs | 0.06 | | 0.04 | 0.04 | 0.06 | 0.01 | 0.06 | 0.02 | 0.01 |
| Water | 0.00 | - | 10.71 | 12.01 | 6.34 | 29.80 | 0.04 | 46.65 | 34.66 |
| Temperature, °F | 100 | 100 | 482 | 539 | 432 | 432 | 100 | 100 | 368 |
| Pressure, psig | 425 | 436 | 385 | 370 | 355 | 355 | 340 | 340 | 450 |
| lbmol/hr | 2,704 | 280 | 4,374 | 4,116 | 3,119 | 998 | 2,697 | 422 | 1,425 |
| BPD | | | 27,921 | 25,869 | | 10,657 | | 2,748 | 13,478 |
| MMscfd | 25 | 3 | 40 | 37 | 28 | - | 25 | - | - |

CONFIGURATIONS AND METHODS FOR FUEL GAS TREATMENT WITH TOTAL SULFUR REMOVAL AND OLEFIN SATURATION

This application is a 371 application of PCT/US08/01971, filed 14 Feb. 2008, which claims the benefit of our U.S. provisional application with the Ser. No. 60/955,004, which was filed Aug. 9, 2007.

FIELD OF THE INVENTION

The field of the invention is gas treating and hydroprocessing, especially as it relates to removal of sulfur contaminants and saturation of olefinic hydrocarbons from refinery off gases to produce a clean fuel gas.

BACKGROUND OF THE INVENTION $CO_2$, $H_2S$, and other sulfur contaminants such as mercaptans and organic sulfurs are routinely removed from various gas streams in many conventional gas treatment configurations. Unfortunately, while most of these configurations remove the acid gases and sulfur contaminants to some degree, they are relatively ineffective in treating highly contaminated off-gases, and particularly refinery off gases that contain significant quantities of heavy hydrocarbons, oxygenates (e.g., carbon monoxide and sulfur dioxides), nitrogen compounds (e.g., cyanides and ammonium compounds), unsaturated hydrocarbons (e.g., olefins, dienes), mercaptans and other organic sulfurous compounds (e.g., methyl mercaptan, ethyl mercaptan, butyl mercaptan, carbonyl sulfide, dimethyl disulfide, carbon disulfide, propanethiol, thiophene, etc.). Therefore, gas treated in such known configurations frequently still contains unacceptable levels of sulfur contaminants (e.g., greater than 50 ppmv) and so fails to meet current environmental regulations. In addition, off gases from catalytic cracking units and other sources contain significant amounts of unsaturated olefinic compounds that often foul the combustion equipment and create unwanted emissions when used as fuel gas.

Chemical solvents such as amines and caustic are often ineffective in removing the heavy mercaptans and organic sulfurs (e.g., propyl mercaptans and DMDS). While physical solvents can absorb these contaminants, they tend to co-absorb excessive amounts of hydrocarbons that are then problematic in downstream processing units such as the sulfur plants. Additionally, many unsaturated olefinic hydrocarbons (e.g., propyldienes, butadienes) are reactive components that tend to polymerize and foul the processing equipment. Still further, relatively high levels of heavy hydrocarbons and mercaptans in the acid gases tend to create operational instability in a sulfur plant and typically require a high flame temperature in the Claus reaction furnace for destruction, which significantly reduces the life of the sulfur plant.

To circumvent at least some of the problems associated with inadequate contaminant removal, various pre- and post treatment methods have been employed. Unfortunately, most of such methods tend to be relatively ineffective and costly, and where contaminants are removed by a fixed bed absorbent, they may further pose a disposal problem for the spent absorbent. Even with pre- and/or post treatment methods, the quality of the acid gas produced in such treatment facilities is often poor and the treated gas still contains significant amounts of the undesirable sulfur and olefinic and aromatic hydrocarbon components, which cannot meet fuel gas specifications and therefore cannot be utilized as fuel gas.

In yet other known processes, and especially hydroprocessing operations during which mercaptans are catalytic converted to $H_2S$, olefinic and aromatic hydrocarbons (e.g., ethylene, propylene, propyldienes, butenes, butadienes, benzene, toluene and heavy olefins) are reactive with other undesirable compounds that will invariably result in fouling of the heat exchangers and reactors and often result in a shutdown of the facility. Moreover, residual olefinic hydrocarbons in fuel gas will also result in undesirable side reactions and emissions in the conversion, combustion or power generation process.

Therefore, while various gas processing treatments and configurations are known in the art, all or almost all of them suffer from one or more disadvantages, and especially where the feed gas comprises relatively high levels of acid gases, olefinic and aromatic hydrocarbons, heavy mercaptans and/or organic sulfurs contaminants.

SUMMARY OF THE INVENTION

The present invention is directed to configurations and methods of treating various fuel gases that contain undesirably high quantities of sulfur compounds and olefins (e.g., fuel gas is a synthesis gas, a landfill waste gas, or a refinery off-gas). More specifically, the gases are first subjected to scrubbing with lean oil streams, typically a hydrotreated lean oil stream and a non-hydrotreated lean oil stream to so produce a rich oil stream and a stripped gas that is then subjected to a hydrotreatment. After hydrotreatment, lean oil is separated from the hydrotreated gas and recycled to the hydrotreater in an amount effective to control temperature in the hydrotreater via evaporation of the lean oil.

In especially preferred aspects the gas phase from the separator is further subjected to COS hydrolysis to produce a hydrolyzed gas from which a hydrogen sulfide-containing gas phase is removed in a downstream separator. The downstream separator preferably produces an additional portion of lean oil, at least a portion of which may be combined with the recycle lean oil stream. Most typically, a hydrogen sulfide removal unit (e.g., using an amine solvent) removes the hydrogen sulfide from the hydrogen sulfide-containing gas phase. In still further preferred aspects, the lean oil and the hydrotreated lean oil are fed to the lean oil scrubbing unit at separate positions.

Therefore, in one aspect of the inventive subject matter, a method of treating a fuel gas will include a step of scrubbing a fuel gas in a lean oil scrubbing unit to remove C5+ components and to form a rich oil and a scrubbed fuel gas, and another step of combining a lean recycle oil and the scrubbed fuel gas to form a hydrotreater feed. In yet another step, the hydrotreater feed is mixed with hydrogen and hydrotreated and the hydrotreated gas effluent is separated into a gas phase and the lean recycle oil. Such methods will typically further include a step of recycling the lean recycle oil to a location at or upstream of the hydrotreater and in an amount effective to maintain hydrotreater temperature via evaporation cooling of the recycle lean oil at a predetermined value.

Various objects, features, aspects and advantages of the present invention will become more apparent from the following detailed description of preferred embodiments of the invention.

BRIEF DESCRIPTION OF THE DRAWING

FIG. 2 is a table illustrating calculated heat and material balance for selected streams for the plant of FIG. 1.

DETAILED DESCRIPTION

The present invention is directed to configurations and methods in which refinery off gases (that are typically used as fuel gas) are treated in two processing steps. Most typically, the off gases are in a first step first scrubbed in a wash column using one or more streams of lean oil (e.g., hydrotreated and/or non-hydrotreated) to remove heavy mercaptans and C5+ hydrocarbons. In a second step, the scrubbed gases are then hydrotreated to saturate olefinic and aromatic hydrocarbons and also to reduce sulfurous compounds in a process configuration where lean recycle oil is used for temperature control of the hydrotreater reactor(s), and where the lean recycle oil is obtained from the hydrotreated product. Thus, a clean fuel gas can be produced and fed to the power plant and/or steam boilers. In preferred aspects of the inventive subject matter, the lean oil is recycled from the hydrotreater reactor outlet separator via mixing with the reactor feed that so cools the hydrotreater reactor via evaporation, thereby controlling the reaction temperature in the hydrotreater, which advantageously minimizes formation of undesirable by-products (e.g., gums and carbon deposits).

Most desirably, temperature control in the hydrotreater via evaporation is achieved by control of the amount of the lean oil fed to the hydrotreater (e.g., using temperature sensor, control valves, and associated control logic, or by using predetermined amounts of lean oil) such that the hydrotreater temperature is maintained at about 490° F. to about 550° F. with a rise in reactor temperature of no more than 100° F., preferably no more than 75° F. and most preferably no more than 50° F. Consequently undesirable side reactions of diene compounds with hydrogen is minimized or even entirely avoided, prolonging continuous operational status. Where required or otherwise advantageous, the hydrotreater may be fluidly coupled to a COS hydrolysis reactor that hydrolyzes residual COS in the reactor outlet to form a further treated gas.

Figure 1:
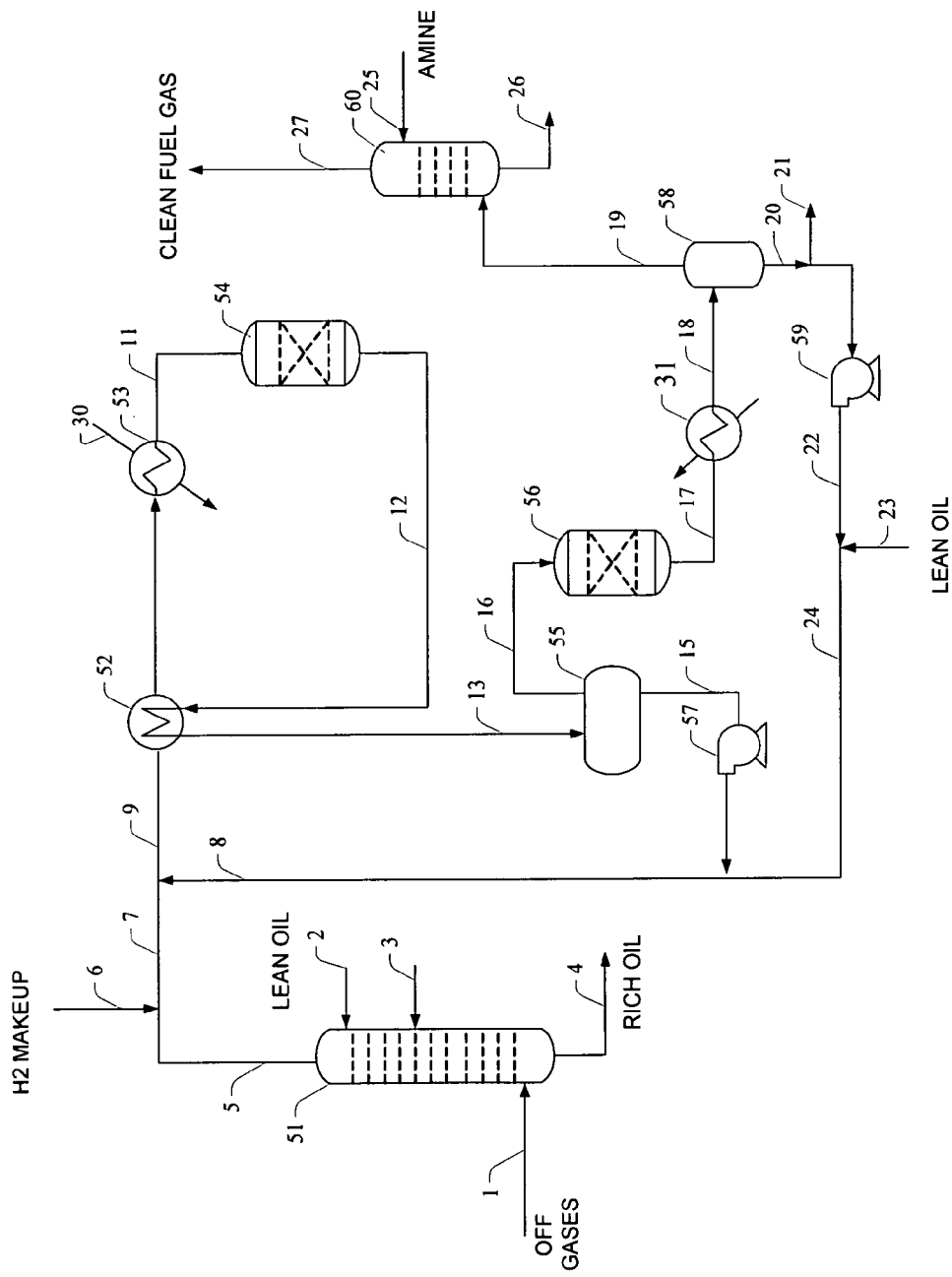
FIG. 1 is one exemplary schematic configuration of a gas treatment plant according to the inventive subject matter.

One exemplary configuration of a fuel gas hydrotreating process is depicted in FIG. 1, and Table 1 of FIG. 2 illustrates the corresponding calculated heat and material balance. Contaminated refinery feed gas stream 1, at a temperature of about 100° F. and a pressure of about 100 to about 420 psig, is scrubbed in column 51 using a refinery lean oil steam 3 (e.g., with less than 0.1 wt % sulfur content) and a hydrotreated lean oil stream 2 (typically sulfur depleted, e.g., less than 50 ppm) to produce a C5+ depleted overhead vapor stream 5 and a C5+ enriched bottom stream 4 that is preferably recycled to the refinery. Stream 5 is mixed with hydrogen stream 6 forming stream 7. Most typically, the hydrogen makeup quantity is controlled by measuring/maintaining a predetermined residual hydrogen concentration at the reactor exit, typically at about 10%, or as otherwise needed for complete olefin saturation reaction and minimizing hydrocarbon coking. The two phase mixture 7 is then mixed with lean oil recycle stream 8 to form stream 9.

Lean oil recycle stream 8 is preferably a C10 to C13 hydrocarbon oil. For example, and viewed from another perspective, the lean oil may comprise a hydrocarbon lean oil (e.g. naphtha characterized by API Gravity ranging from 45 to 95, and RVP (Reid Vapor Pressure) of 2 to 12.0 psia) to selectively absorb the complex sulfur contaminants (e.g., mercaptans and organic sulfur). Therefore, suitable lean oil may include raw un-hydrotreated naphtha and hydrotreated naphtha, or diesel hydrocarbons that have affinity for complex sulfur contaminants over other compounds, including oxygen, CO, and/or $CO_2$. Thus, typical lean oils may therefore include naphtha or diesel from a refinery or hydrocarbon processing unit and is characterized by API Gravity ranging from 45 to 95, and RVP (Reid Vapor Pressure) of 2 to 11.0 psia.

The recycle oil flow and composition are adjusted as needed to maintain the rise in reactor temperature at about 50° F. using the sensible heat as well as latent heat of vaporization of the recycle oil for cooling. As used herein, the term "about" in conjunction with a numeral refers to a range of that numeral starting from 20% below the absolute of the numeral to 20% above the absolute of the numeral, inclusive. For example, the term "about 100° F." refers to a range of 80° F. to 120° F., and the term "about 100 psig" refers to a range of 80 psig to 120 psig.

The gas oil mixture stream 9 is heated in feed/effluent exchanger 52 and steam heater 53, using high pressure steam 30 to form stream 11. Other heat sources including electric heater or fuel fired heater can also be used if high pressure steam is not available. The reactor inlet temperature is adjusted via exchanger and heater as necessary for a desired degree of the olefinic saturation and total sulfur conversion in the hydrotreater (e.g., at about 480° F. to 550° F.). As will be readily appreciated by the person of ordinary skill in the art, hydrotreater reactor 54 will include suitable reactor internals and distributors and liquid injection quenching to ensure uniform distribution of the two phase mixture. Furthermore, it should be recognized that all known suitable catalysts may be used in conjunction with the teachings presented herein. For example, cobalt molybdenum or nickel molybdenum based catalysts may be used to promote the olefinic saturation reaction and the desulphurization reaction, both of which are highly exothermic reactions. If the reaction temperature is uncontrolled, the extreme high temperature will cause runaway reaction, producing side reactions that typically lead to formation of carbon deposits or gums. To avoid gum formation that will cause fouling of the heat exchangers and reactor, the temperature rise in the hydrotreater reactor is maintained at less than 100° F., more preferably less than 75° F., and most preferably less than 50° F. by evaporating the lean oil content in stream 11. Preferably, the recycle oil rate is controlled such that the stream 9, 11, and 12 should contain about 1% to 50% liquid, more typically about 3% to 40% liquid, and most typically about 5% to 30% liquid. Such liquid content is particularly preferred as the liquid is not only used for temperature control, but can also be employed to clean and wash any reaction byproducts and avoid shutdown from equipment fouling. The reactor effluent 12 is then heat exchanged with the feed gas 9 forming the effluent stream 13 which is separated in separator 55 that forms a vapor stream 16 and a liquid stream 15.

The liquid stream 15 is then pumped by pump 57 for oil recycle and the vapor stream 16 is processed in COS hydrolysis reactor 56 where the COS is converted to hydrogen sulfide via hydrolysis reaction $COS+H_2O \leftrightarrow H_2S+CO_2$. The hydrolysis reaction is exothermic and can typically convert at least over about 95% of the COS content. The COS hydrolysis reactor effluent 17 is cooled with ambient cooler 31, forming stream 18, which is separated in separator 58 producing an $H_2S$ containing hydrocarbon stream 19 and a flashed lean oil stream 20. A small portion of the lean oil, stream 21, is purged to maintain the recycle oil quality, and the main portion is recycled by pump 59 forming stream 22. Lean oil makeup stream 23 is added as needed to form stream 24 to replenish the oil inventory. The treated gas stream 19 is fed to the hydrogen sulfide removal unit 60 in which lean amine solvent stream 25 is used to form clean fuel gas stream 27. The rich amine stream 26 is processed and regenerated in conventional manner to form lean amine stream 25. Where desired, alternative hydrogen sulfide removal units may also used, and suitable units include membrane and/or solvent-based separators, solid phase adsorption, etc.

Therefore, and viewed from a different perspective, it should be appreciated that plants and methods of removing C5+ hydrocarbons and sulfur compounds from a contaminated fuel gas include treating the fuel gas with at least one, and more preferably at least two lean oils, wherein the first lean oil is supplied from refinery processing units, and wherein the second lean oil may be supplied/recycled from a hydrotreater unit. In such configurations, the first lean oil is used for bulk C5+ hydrocarbon removal, and the second lean oil is used for polishing the feed gas to meet low sulfur specifications. Where desired, a COS hydrolysis stage may be added to further reduce unwanted sulfur compounds, typically via a downstream amine absorber that the so formed hydrogen sulfide.

Figure 3:
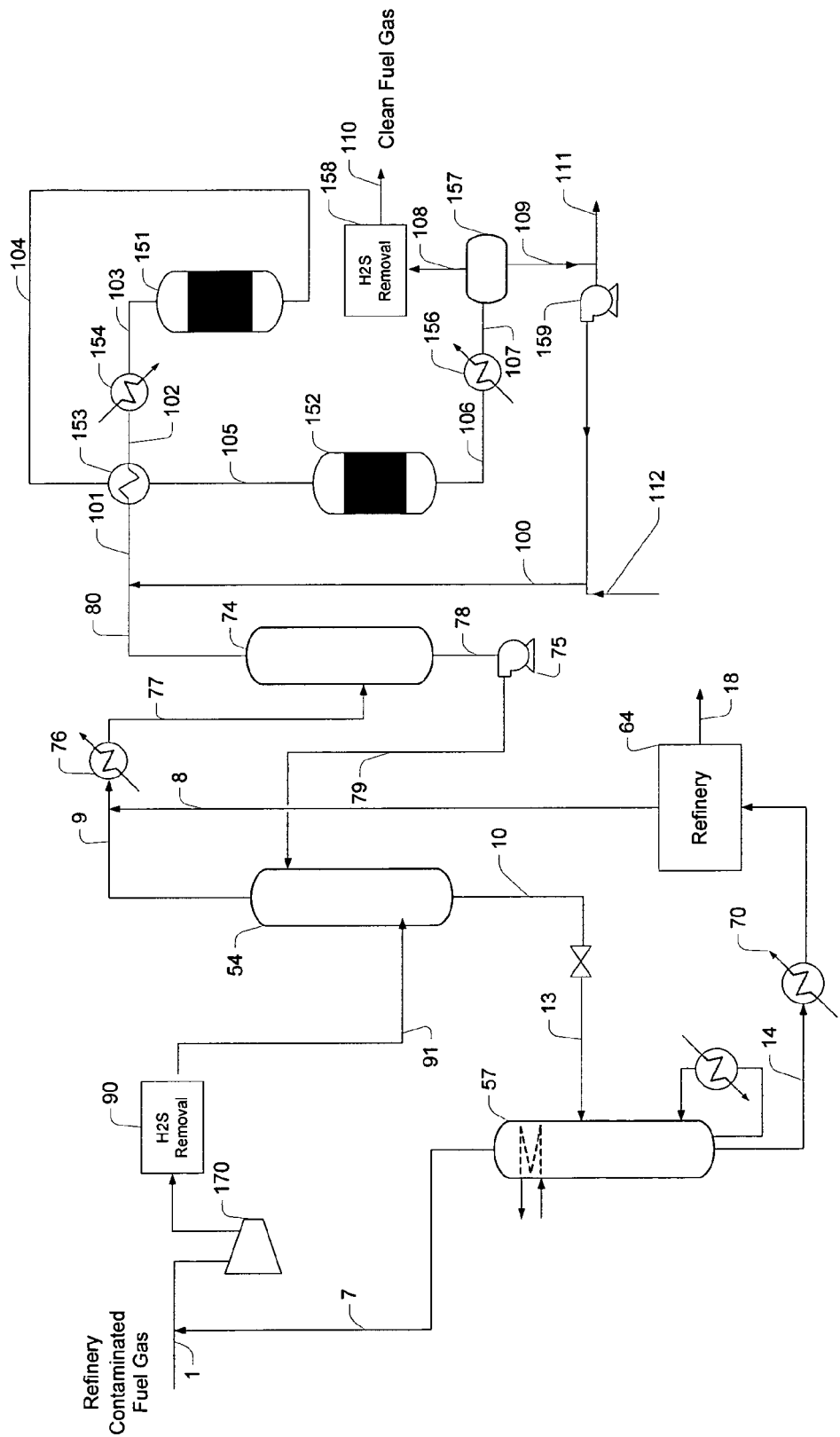
FIG. 3 is another exemplary schematic configuration of a gas treatment plant according to the inventive subject matter.

Alternatively, as depicted in FIG. 3, an upstream treating and contaminant removal may be used where one or two absorbers are configured to remove the bulk of sulfurous compounds using one or more lean oil streams. Most preferably, hydrogen sulfide is removed upstream of the absorbers in a conventional hydrogen sulfide removal unit.

Here, a feed gas compressor 170 compresses the fuel gas 1, which is then routed to hydrogen sulfide removal unit 90 to form stream 91. Absorber 74 is located downstream of absorber 54. It is further preferred that intercooler 76 cools the treated gas from the upstream absorber 54 by removing the heat of absorption to thus increase sulfur absorption efficiency in the downstream absorber 74. In this configuration, the overhead vapor stream 9 from the first absorber is mixed with (typically unhydrotreated) lean oil stream 8 and is cooled in exchanger 76 to about 90° F. or lower. The so formed two-phase mixed stream 77 is flashed into the bottom of the downstream absorber 74. The mercaptan-enriched semi-lean oil 78 from the downstream absorber (which is typically a mixture of hydrotreated and non-hydrotreated lean oil) is pumped by pump 75 forming stream 79 that is fed to the upstream absorber 54 for further sulfur absorption. Bottom stream 10 of upstream absorber 54 is let down in pressure to form stream 13 that is then fed to distillation column 57 that produces a light overhead vapor 7 that is recycled back to the fuel gas via combination with stream 1. The complex sulfur rich lean oil bottom product 14 from distillation column 57 is (after being cooled in cooler 70) recycled to the refinery 64 (typically including a hydrotreater unit, which provides lean oils and hydrotreated lean oil to the process) that produces lean oil stream 8 and hydrocarbon product stream 18.

The treated gas stream 80 from the downstream absorber 74 is mixed with lean oil recycle stream 100 forming mixed stream 101 and is heated in a feed/effluent exchanger 153 to form stream 102. A second heater 154, typically using high pressure steam, is used to heat the two phase mixture to about 450° F. to form stream 103. As before, in hydrotreater reactor 151, olefinic hydrocarbons are converted to paraffinic hydrocarbons and the sulfur contaminants (mainly mercaptans) are converted to hydrogen sulfide. Typically, cobalt molybdenum or nickel molybdenum based catalysts are used to promote the olefinic saturation reaction and the desulphurization reaction which are highly exothermic reactions.

The temperature rise in the hydrotreater reactor is controlled to preferably to a temperature increase of less than 50° F. to 100° F. by evaporating at least some of the lean oil content in stream 103. The reactor effluent 104 is then heat exchanged with the hydrotreater feed gas 101 forming the effluent stream 105 which is further processed in COS hydrolysis reactor 152 where the COS formed in the hydrotreater is re-converted back to hydrogen sulfide. The COS hydrolysis reactor effluent 106 is cooled with ambient cooler 156 forming stream 107. The vaporized lean oil is thus recondensed and separated in separator 157 which produces the hydrogen sulfide containing hydrocarbon stream 108 and the lean oil stream 109. A portion of the lean oil is removed (stream 111, e.g., for control of lean oil composition) and the remaining portion is recycled by pump 159 to the front section of the hydrotreater. Lean oil stream 112 is made up to the unit as needed and combined with the remaining portion to form recycle lean oil stream 100. The treated gas stream 108 is treated in the hydrogen sulfide removal unit 158 typically using an amine solvent, membrane unit, or solid phase adsorption, forming the clean gas stream 110. Further suitable configurations, methods, and considerations are disclosed in our copending International application with the serial number PCT/US07/17054, filed Jul. 30, 2007, which is incorporated by reference herein.

Thus, specific embodiments and applications of removal of sulfur-containing contaminants from various gases have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A fuel gas treatment system comprising:
   a lean oil scrubbing unit configured to allow removal of C5+ components from a fuel gas and to allow production of a rich oil and a scrubbed fuel gas;
   a hydrotreater fluidly and downstream coupled to the scrubbing unit and configured to receive a mixture of the scrubbed fuel gas and a recycle lean oil and to allow hydrotreating the mixture of the scrubbed fuel gas and the recycle lean oil to thereby form a hydrotreated gas effluent;
   a separator fluidly and downstream coupled to the hydrotreater and configured to receive the hydrotreated gas effluent, and further configured to form a gas phase and the recycle lean oil; and
   a recycle conduit fluidly coupled to the separator and configured to allow recycling of the recycle lean oil to the hydrotreater to a location and in an amount effective to maintain hydrotreater temperature via evaporation of the recycle lean oil at a predetermined value.

2. The fuel gas treatment system of claim 1 further comprising a COS hydrolysis unit that is fluidly coupled to the separator and configured to produce a hydrolyzed gas phase from the gas phase, and further comprising a second separator that is coupled to the COS hydrolysis unit and configured to receive the hydrolyzed gas phase and to allow production of separate additional lean oil and a hydrogen sulfide-containing gas phase from the hydrolyzed gas phase.

3. The fuel gas treatment system of claim 2 further comprising a conduit that is configured to combine at least a portion of the additional lean oil with the recycle lean oil.

4. The fuel gas treatment system of claim 2 further comprising a hydrogen sulfide removal unit that is fluidly coupled to the second separator and that is configured to allow production of an olefin and sulfur depleted fuel gas from the hydrogen sulfide-containing gas phase.

5. The fuel gas treatment system of claim 4 wherein the hydrogen sulfide removal unit comprises an amine unit.

6. The fuel gas treatment system of claim 1 wherein the lean oil scrubbing unit is configured to receive at separate positions a lean oil and a hydrotreated lean oil.

7. The fuel gas treatment system of claim 1 further comprising a heater and a heat exchanger, wherein the heat exchanger is configured to allow heating of the scrubbed fuel gas using heat content of the hydrotreated gas effluent.

8. The fuel gas treatment system of claim 1 wherein the fuel gas is a synthesis gas, a landfill waste gas, or a refinery off-gas.

9. A method of treating a fuel gas, comprising:
scrubbing a fuel gas in a lean oil scrubbing unit to remove C5+ components and to form a rich oil and a scrubbed fuel gas;
combining a lean recycle oil and the scrubbed fuel gas, and hydrotreating the combined lean recycle oil and scrubbed fuel gas in a hydrotreater to form a hydrotreated gas effluent;
separating the hydrotreated gas effluent into a gas phase and the lean recycle oil; and
recycling the lean recycle oil to a location at or upstream of the hydrotreater and in an amount effective to maintain hydrotreater temperature via evaporation of the recycle lean oil at a predetermined value.

10. The method of claim 9 further comprising a step of hydrolyzing the gas phase in a COS hydrolysis unit to produce a hydrolyzed gas phase, and separating in a second separator the hydrolyzed gas phase to produce additional lean oil and a hydrogen sulfide-containing gas phase.

11. The method of claim 10 further comprising a step of combining at least a portion of the additional lean oil with the recycle lean oil.

12. The method of claim 10 further a step of removing hydrogen sulfide from the hydrogen sulfide-containing gas phase to thereby produce an olefin and sulfur depleted fuel gas.

13. The method of claim 12 wherein the step of removing the hydrogen sulfide is performed using an amine solvent.

14. The method of claim 9 wherein the lean oil scrubbing unit is configured to receive at separate positions a lean oil and a hydrotreated lean oil.

15. The method of claim 9 wherein the scrubbed fuel gas is heated in a heat exchanger using heat content of the hydrotreated gas effluent.

16. The method of claim 9 wherein the fuel gas is a synthesis gas, a landfill waste gas, or a refinery off-gas.

* * * * *